US009941579B2

(12) United States Patent
Abbinante

(10) Patent No.: US 9,941,579 B2
(45) Date of Patent: Apr. 10, 2018

(54) EQUIPMENT MOUNTING DEVICE

(71) Applicant: Rob Abbinante, Itasca, IL (US)

(72) Inventor: Rob Abbinante, Itasca, IL (US)

(73) Assignee: Armstrong Aerospace, Inc., Itasca, IL (US)

(*) Notice: Subject to any disclaimer, the term of this patent is extended or adjusted under 35 U.S.C. 154(b) by 0 days.

(21) Appl. No.: 15/172,352

(22) Filed: Jun. 3, 2016

(65) Prior Publication Data

US 2016/0359218 A1 Dec. 8, 2016

Related U.S. Application Data

(60) Provisional application No. 62/170,851, filed on Jun. 4, 2015.

(51) Int. Cl.

*F16L 3/00* (2006.01)
*H01Q 1/32* (2006.01)
*H01Q 1/12* (2006.01)

(52) U.S. Cl.

CPC ......... *H01Q 1/3275* (2013.01); *H01Q 1/1214* (2013.01)

(58) Field of Classification Search

USPC .......................................................... 248/121
See application file for complete search history.

(56) References Cited

U.S. PATENT DOCUMENTS 6,329,954 B1 * 12/2001 Fuchs ...................... H01Q 9/28 343/725
7,274,336 B2 * 9/2007 Carson ................... H01Q 21/00 343/705
7,283,100 B2 * 10/2007 Thompson ............... H01Q 1/42 343/700 MS
7,304,614 B2 * 12/2007 Silva .................... H01Q 1/3275 343/711
7,333,065 B2 * 2/2008 Lindackers .......... H01Q 1/3275 343/713
7,528,784 B2 * 5/2009 Yamada ............... H01Q 1/3275 343/713
8,059,044 B2 * 11/2011 Rode .................... H01Q 1/1214 343/713
8,081,126 B2 * 12/2011 Ikeda ................... H01Q 1/1207 343/700 MS
8,094,085 B2 * 1/2012 Sato ......................... H01Q 1/12 343/711
8,519,897 B2 * 8/2013 Duzdar .................. H01Q 21/28 343/711
8,836,590 B2 * 9/2014 Marten ................ H01Q 1/3275 343/711
8,947,307 B2 * 2/2015 Lo ........................ H01Q 1/3275 343/711

(Continued)

FOREIGN PATENT DOCUMENTS

KR 1020140136682 A 12/2014

OTHER PUBLICATIONS

International Search Report and Written Opinion filed in PCT/US2016/035662; dated Sep. 12, 2016; 10 pgs.

*Primary Examiner* — Monica E Millner
(74) *Attorney, Agent, or Firm* — Vedder Price P.C.

(57) ABSTRACT

A mounting device including a top surface, an opening, a plurality of mounting units, and a reinforced portion extending along the bottom of the top surface in the areas between the openings and the mounting units.

14 Claims, 6 Drawing Sheets

(56) References Cited

U.S. PATENT DOCUMENTS

| | | | | |
|---|---|---|---|---|
| 9,413,062 | B2 * | 8/2016 | Ortiz | H01Q 1/1214 |
| 9,447,806 | B2 * | 9/2016 | Morris | F16B 5/0628 |
| 9,496,624 | B2 * | 11/2016 | Juan | H01Q 21/30 |
| 9,614,272 | B2 * | 4/2017 | Wallace | H01Q 1/28 |
| 2006/0227057 | A1 * | 10/2006 | Lu | H01Q 1/3275 343/713 |
| 2006/0238427 | A1 * | 10/2006 | Ferguson | H01Q 1/286 343/705 |
| 2006/0290580 | A1 * | 12/2006 | Noro | H01Q 21/28 343/715 |
| 2007/0171138 | A1 * | 7/2007 | Noro | H01Q 1/3275 343/713 |
| 2010/0277379 | A1 * | 11/2010 | Lindackers | H01Q 1/1207 343/713 |
| 2011/0068248 | A1 | 3/2011 | Miller et al. | |
| 2012/0086613 | A1 * | 4/2012 | Lundeen | H01Q 1/1214 343/705 |
| 2012/0188143 | A1 | 7/2012 | Yang et al. | |
| 2013/0026331 | A1 | 1/2013 | Kodaka | |
| 2015/0130672 | A1 * | 5/2015 | Cordone | H01Q 1/42 343/705 |

* cited by examiner

EQUIPMENT MOUNTING DEVICE

RELATED APPLICATIONS

This application claims priority on U.S. Provisional Application 62/170,851, filed Jun. 4, 2015, titled "EQUIPMENT MOUNTING DEVICE."

BACKGROUND OF THE INVENTION

Mounting of equipment on vehicles, such as aircraft, has become routine. As more vehicles communicate over wireless connections, more antennas are mounted to vehicles to maintain different wireless connections. However, exposed antennas on a moving vehicle are susceptible to being struck by an object passing by the vehicle.

Radomes are used to mount and protect the equipment mounted on vehicles. Conventional mounting devices are made of metal such as steel and aluminum, and provide adequate support, but increase the overall weight of the vehicle decreasing the vehicle's performance. A need exists for a mounting device on a vehicle that provides adequate strength while minimizing the weight added to the vehicle.

BRIEF SUMMARY OF THE INVENTION

One embodiment of the present disclosure includes a mounting device including a top surface, an opening, a plurality of mounting units, and a reinforced portion extending along the bottom of the top surface in the areas between the openings and the mounting units.

In another embodiment, the opening is sized to accommodate communication wiring.

Another embodiment includes a device mounting ring on the opening.

Another embodiment includes a closeout flange extending around the periphery of the mounting device.

In another embodiment, the closeout flange creates an aerodynamic seal between the mounting device and the surface of a vehicle.

In another embodiment, the reinforced portion is filled with a honeycomb shaped structure.

In another embodiment, the thickness of the reinforced portion is greater than an unreinforced portion.

In another embodiment, the device mounting ring is made of fiberglass.

In another embodiment, the reinforced portion extends across a substantial surface area of the mounting device.

In another embodiment, the mounting device is made of fiberglass.

Another embodiment of the present disclosure includes a method of manufacturing a mounting device, the method including forming an opening in a top surface of the device, forming a plurality of mounting units in the top surface of the device, and forming a reinforced portion that extends along the bottom of the top surface in the areas between the openings and the mounting units.

In another embodiment, the opening is sized to accommodate communication wiring.

Another embodiment includes forming a device mounting ring on the opening.

Another embodiment includes forming a closeout flange extending around the periphery of the mounting device.

In another embodiment, the closeout flange creates an aerodynamic seal between the mounting device and the surface of a vehicle.

In another embodiment, the reinforced portion is filled with a honeycomb shaped structure.

In another embodiment, the thickness of the reinforced portion is greater than an unreinforced portion.

In another embodiment, the device mounting ring is made of fiberglass.

In another embodiment, the reinforced portion extends across a substantial surface area of the mounting device.

In another embodiment, wherein the mounting device is made of fiberglass.

DETAILED DESCRIPTION OF THE INVENTION

Figure 1:
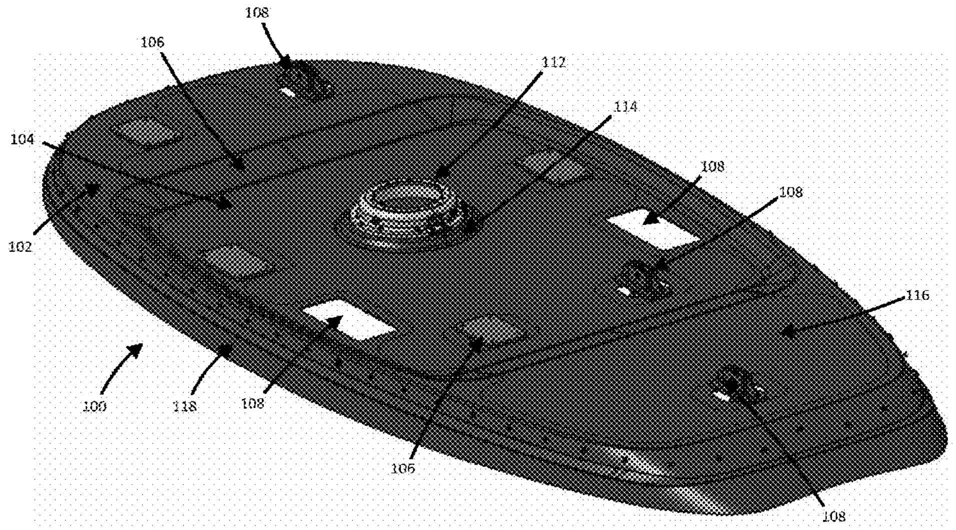
FIG. 1 discloses a perspective view of a top portion of a mounting device.

FIG. 1 discloses a perspective view of a top portion of a mounting device 100. The mounting device 100 includes a top surface 102 including a recessed portion 104. The recessed portion 104 may be sized to accommodate a device (not shown) that will be mounted to the mounting device. The recessed portion 104 includes a wall 106 that connects an upper portion of the top surface 102 to the recessed portion 104. In one embodiment, the wall 106 slopes from the top surface 102 to the recessed surface 104 at a predetermined angle.

A plurality of device mounting units 108 positioned in the top surface 102 and recessed portion 104 of the mounting device. The mounting units 108 extend through the top surface and are positioned to mount devices to the top surface 102 of the mounting device 100. The mounting device 100 includes equipment access openings 110 that are sized to accommodate wires, cables and other devices required to connect and operate the equipment mounted in the mounting device 100. A device mounting ring 112 is affixed to an opening 114 in the center of the mounting device 100. The device mounting ring 112 is configured to secure a device to the top surface 102 of the mounting unit 102. The mounting device 100 is shaped such that one end of the mounting device 100 is wider than an opposite end such that the mounting device 100 has a substantially drop shape.

A reinforced portion 116 may be formed in the mounting device 100. The reinforced portion 116 may be configured such that additional weights and loads may be applied to the reinforced portion 116. The reinforced portion 116 may extend across a substantial portion of the mounting device 100 including the top surface 102 and recessed area 104. The reinforced portion 116 may extend between the equipment access openings 110 and the device mounting units 106 to provide additional support for these structures. A closeout flange 118 extends around the periphery of the mounting device 100. The closeout flange 118 is used to provide an aerodynamic seal between the mounting device 100 and the surface upon which them mounting device 100 is secured.

The mounting device 100 may be made from any light weight ridged material including carbon fiber, fiberglass or any other light-weight rigid material. In one embodiment, the reinforced portion of the mounting device 100 is made of carbon fiber. In another embodiment, the top surface 102 of the mounting device is made of fiberglass and the reinforced portion 114 is made of carbon fiber.

Figure 2:
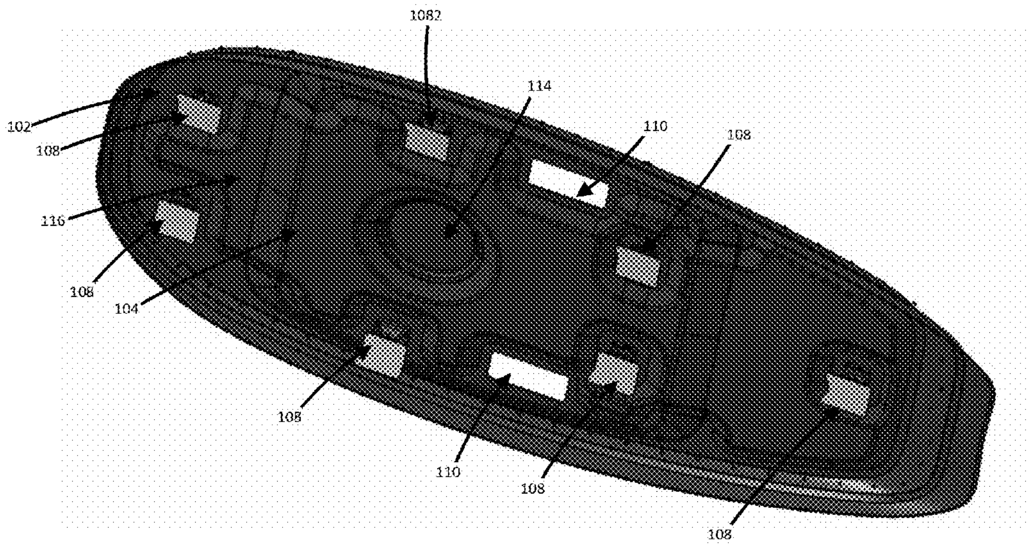
FIG. 2 discloses a perspective view of a bottom portion of the mounting device in FIG. 1.

FIG. 2 depicts a perspective view of a bottom portion 200 of the mounting device 100. The reinforced portion 116 extends from the back side of the top surface and has a thickness that is greater than the top surface. The reinforced portion 116 may be made of a solid material or may incorporate a honeycomb structure to aide in strength of the reinforced portion 116. The reinforced portion 116 adds additional thickness and rigidity to the mounting device, including the recessed portion 104, by adding additional material or structure to the load bearing portions of the mounting device 100.

Figure 3:
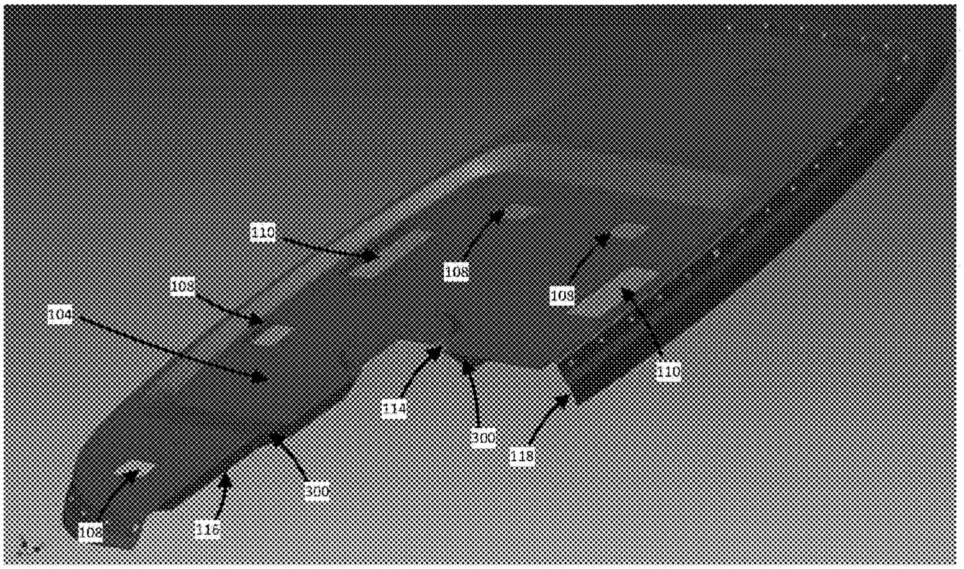
FIG. 3 depicts a cut away view of the mounting unit in FIG. 1.

FIG. 3 depicts a cut away view of the mounting unit 100. The reinforced portion 116 extends from a side of the mounting unit 100 into the recessed portion 104 of the mounting unit 100. The reinforced portion 116 includes additional material 300 giving the reinforced portion 116 a greater thickness than the non reinforced portions of the mounting device. The reinforced material may be a honeycomb structure made of aramid fiber sheets such as HRH-10 NOMEX. By providing the honeycomb structure to the interior of the reinforced portions 116, the strength of the mounting device 100 is increased without significantly increasing the weight of the mounting unit 100.

Figure 4:
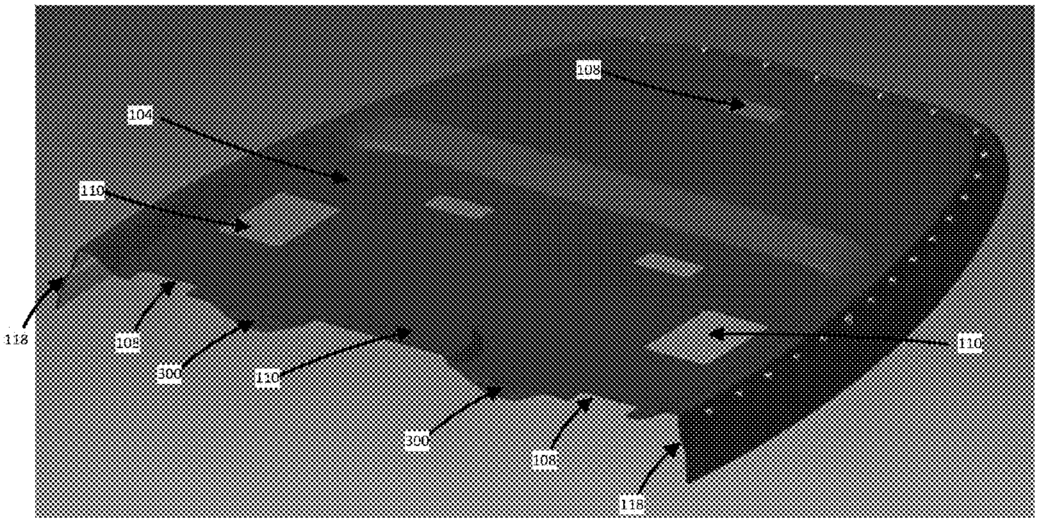
FIG. 4 depicts a cut away view of the area around the opening in the mounting device of FIG. 1.
Figure 5:
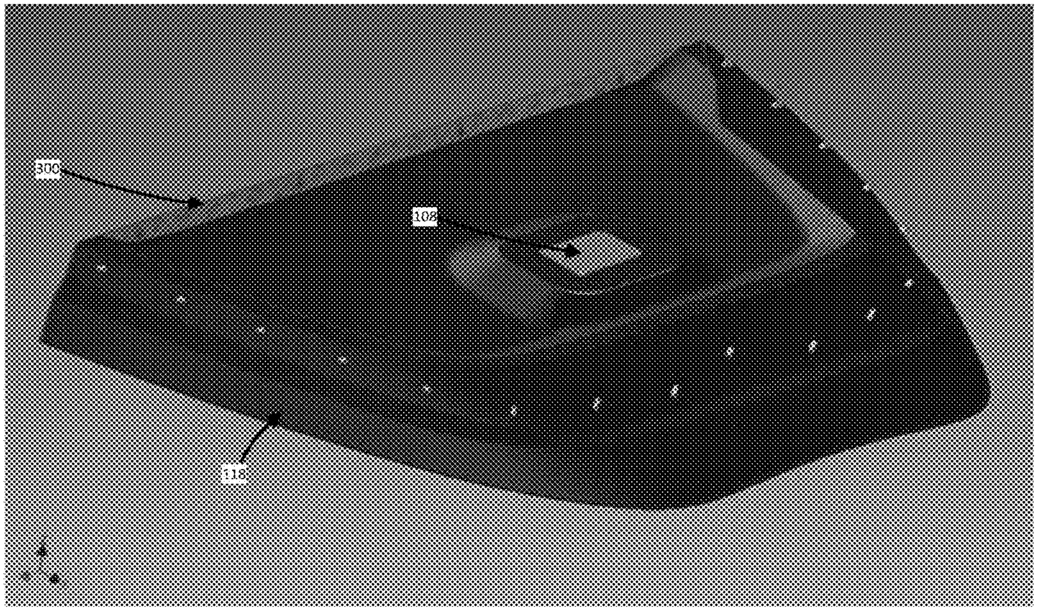
FIG. 5 depicts a cut away view an end of the mounting device of FIG. 1.

FIG. 4 depicts a cut away view of the area around the opening 114 in the mounting device 100. The opening 114 may include a ring made of fiberglass. The reinforced portion 116 surrounds the periphery of the opening 114 to provide additional strength to the area around the opening 114. The reinforced portion 116 is formed between the opening 114 and the mounting units 108 such that the area between the opening 114 and mounting units 108 include the additional material 300 to increase the areas ability to withstand the tensile and compressive stresses applied to the area between the opening 114 and mounting units 108. FIG. 5 depicts a cut away view an end of the mounting device 100. The reinforced portion 116 at the end of the mounting device 100 includes a honeycomb structure which increases the overall strength of the end of the mounting device 100.

Figure 6:
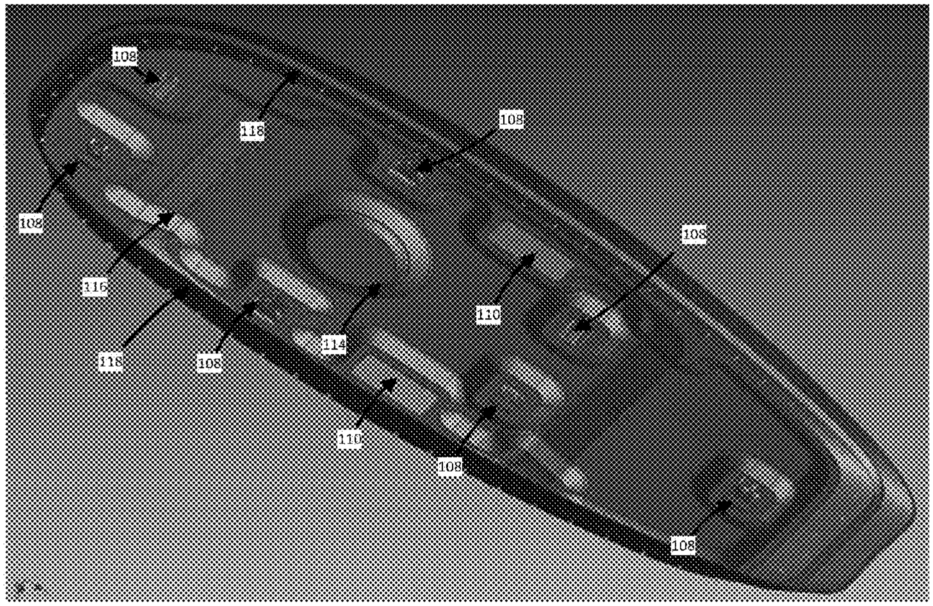
FIG. 6 depicts a bottom perspective view of the mounting device of FIG. 1.

FIG. 6 depicts a bottom perspective view of the mounting device 100. The closeout flange 118 extending around the periphery of the mounting device 100 extends from the top surface 102 to a point beyond the reinforced portion 116 such that the depth of the closeout flange is larger than the depth of the reinforced portion 116. By reinforcing the areas in proximity to openings in the mounting device 100, the strength of the mounting device 100 is increased. When the reinforced material 300 is a honeycomb structure of a light weight material such as carbon fiber or fiberglass, the additional strength provided to the mounting device 100 has a minimal impact on the weight of the mounting device.

Figure 7:
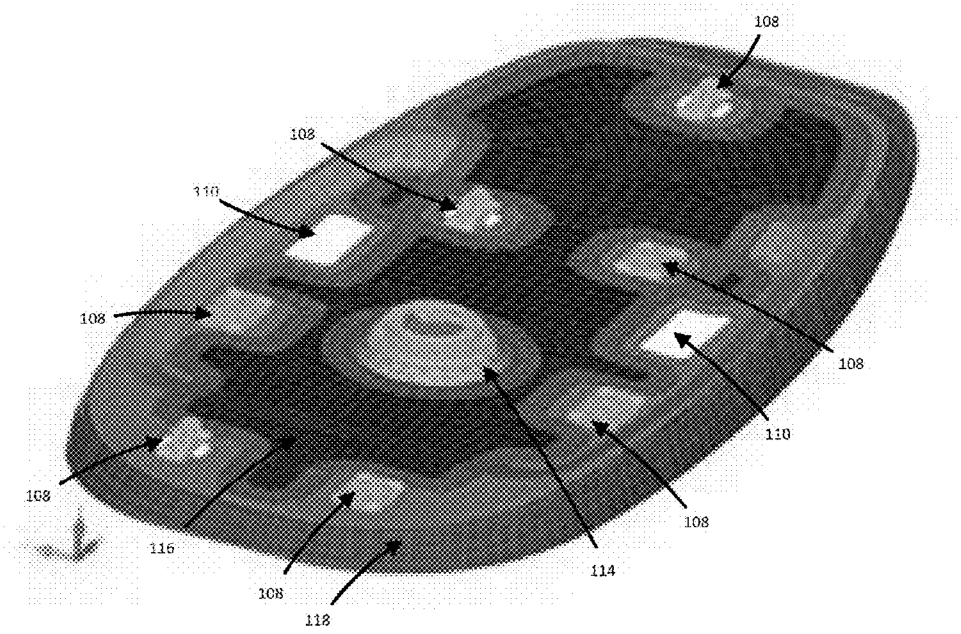
FIG. 7 depicts a stress analysis of the mounting device.

FIG. 7 depicts a stress analysis of the mounting device 100. As FIG. 7 depicts, by including the reinforced portions 116, the stress in the reinforced portions 116, shown in blue, is less than the unreinforced portions, shown in yellow, of the mounting device 100.

Figure 8:
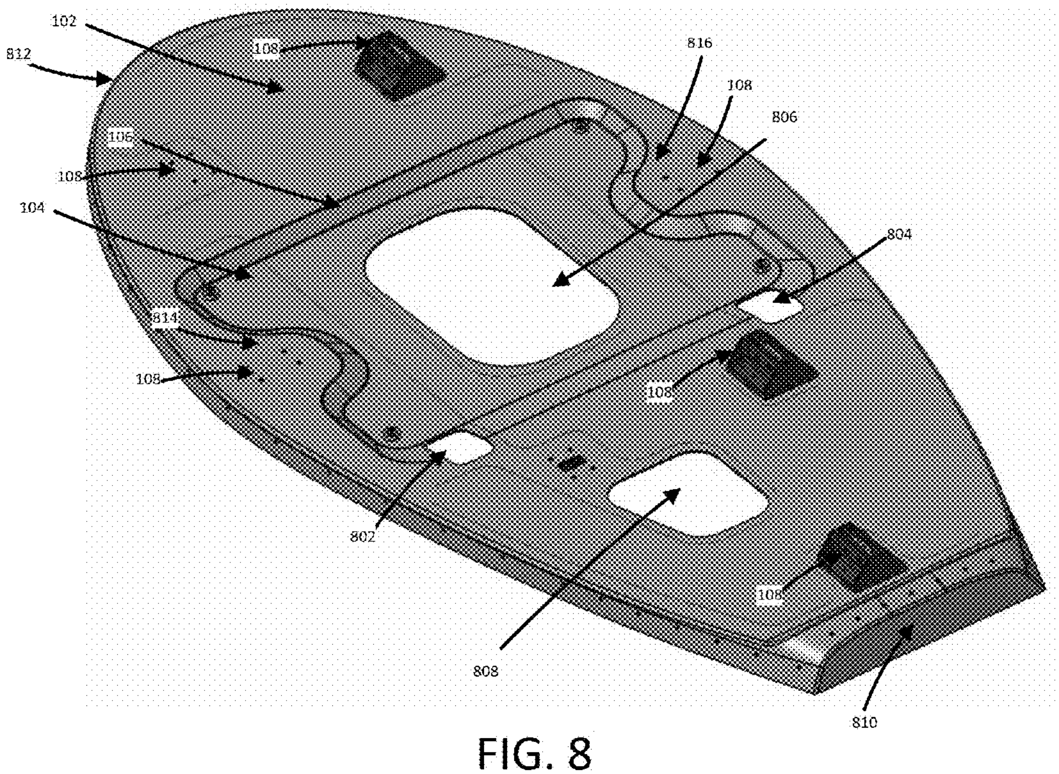
FIG. 8 depicts a top view of another embodiment of a mounting device.

FIG. 8 depicts a top view of another embodiment of a mounting device. The mounting device 800 includes a top surface 102, a recessed portion 104, a side wall 106, mounting devices 108, sidewall openings 802 and 804, a center opening 806 and a rear opening 808. One end 810 of the mounting device 800 has a larger height than the opposite end 812 with the higher end 810 being substantially semi-circular in cross sectional shape. Two raised portions 814 and 816 extend into to the recessed portion 104 with mounting devices 108 being positioned on each projection 814 and 816. In one embodiment, no mounting devices are positioned in the recessed portion 104.

Figure 9:
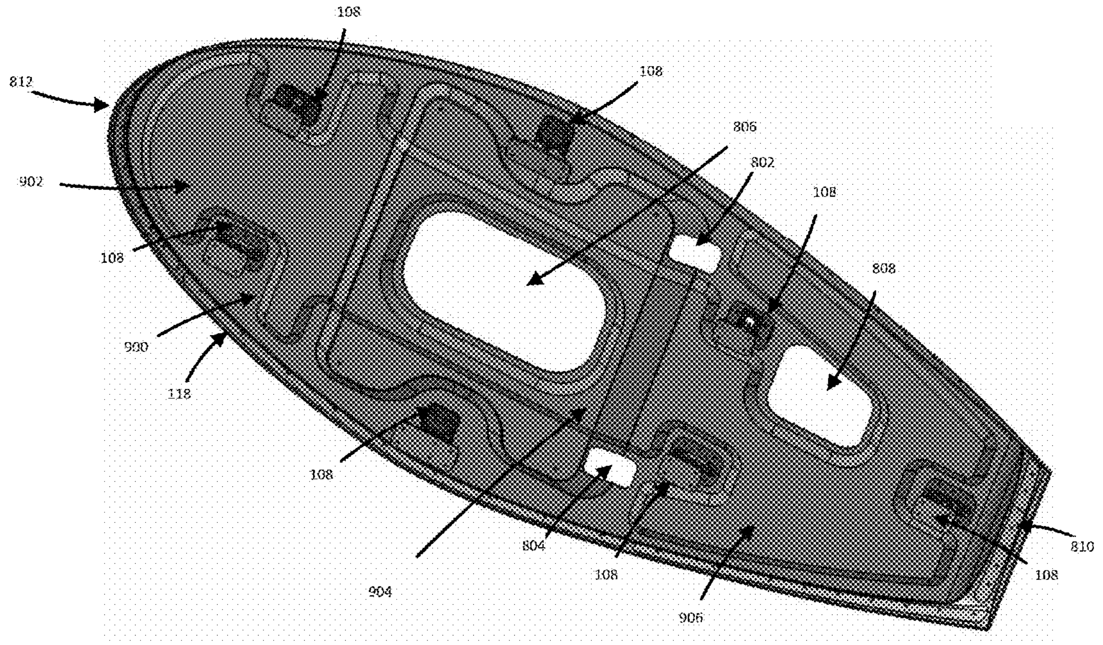
FIG. 9 depicts a bottom view of the mounting device of FIG. 8.

FIG. 9 depicts a bottom view of the mounting device 800. The bottom surface of the mounting device 800 includes a reinforced portion 900. The reinforced portion 900 includes a first portion 902, a second portion 904 and a third portion 906. The first portion 902 is positioned by the lower side 812 of the mounting device 800 and surrounds the two mounting units 108 near the lower side 812 of the mounting device 800. The second portion 904 extends from the first portion 902 and covers a portion of the bottom of the recessed area 104 between the two projections 814 and 816 without extending over the sidewall openings 802 and 804. The third portion 906 extends from the second portion 904 and surrounds the rear opening 808 and the mounting devices 108 near the rear opening 808.

Figure 10:
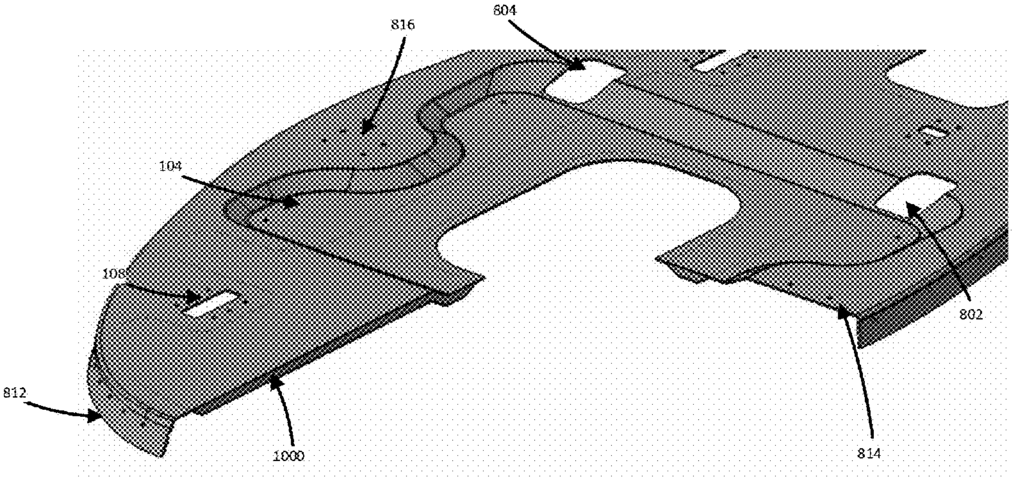
FIG. 10 depicts a cut away view of the mounting unit FIG. 8 by a lower end.

FIG. 10 depicts a cut away view of the mounting unit 800 by the lower end 810. The first portion 902 of the reinforced portion 900 extends around the mounting units 108 near the lower end 812 with the second reinforced portion 904. The reinforced portions 902 and 904 include additional material 1000 giving the reinforced portions 902 and 904 a greater thickness than the non reinforced portions of the mounting device. The reinforced material may be a honeycomb structure made of aramid fiber sheets such as HRH-10 NOMEX. By providing the honeycomb structure to the interior of the reinforced portions 902 and 904, the strength of the mounting device 800 is increased without significantly increasing the weight of the mounting unit 800.

Figure 11:
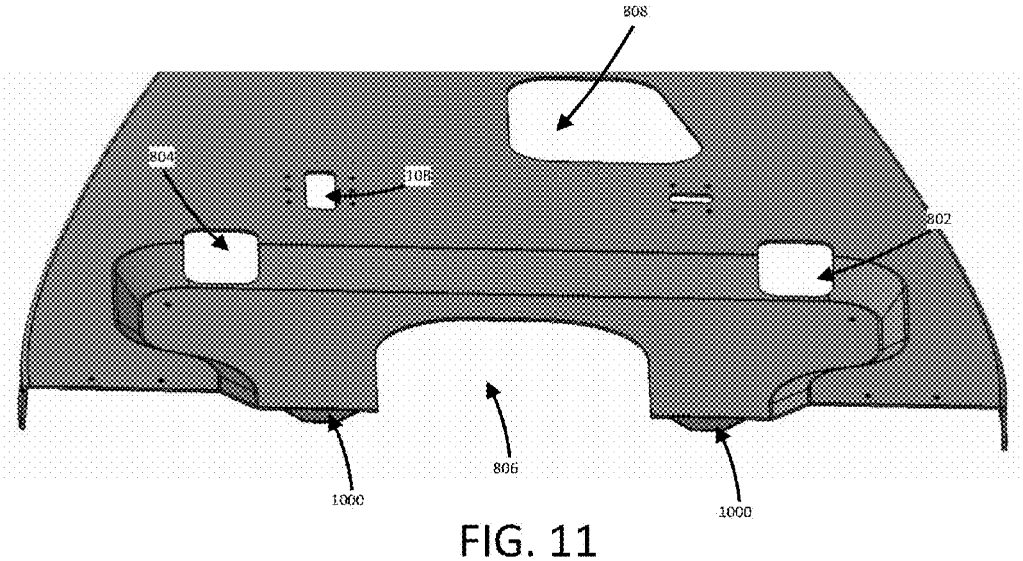
FIG. 11 depicts a cut away view of the mounting unit of FIG. 8 through a center portion.

FIG. 11 depicts a cut away view of the mounting unit 800 through a center portion of the mounting unit 800. The second reinforced portion 904 extends through the recessed portion 104 with additional material 1000 being added to the lower area of the recessed portion 104 where the second reinforced portion 904 extends through the recessed area 104.

The invention claimed is:

1. A mounting device comprising:

a top surface;

an opening;

a plurality of mounting units;

an integrally formed reinforced portion extending across a substantial portion of the mounting device including a recessed portion and the top surface from a back portion to a front portion of the device along a bottom of the top surface in at least one area between the opening and the mounting units;

wherein the reinforced portion includes a honeycomb structure; and a close-out flange extending around the periphery of the mounting device and aerodynamically sealing between the mounting device and surface of a vehicle extending from the top surface to a point beyond the reinforced portion so that the depth of the close-out flange is larger than the depth of the reinforced portion.

2. The mounting device of claim 1 wherein the opening is sized to accommodate communication wiring.

3. The mounting device of claim 1 including a device mounting ring on the opening.

4. The mounting device of claim 1 wherein the thickness of the reinforced portion is greater than an unreinforced portion.

5. The mounting device of claim 3 wherein the device mounting ring is made of fiberglass.

6. The mounting device of claim 1 wherein the reinforced portion extends across a substantial surface area of the mounting device.

7. The mounting device of claim 1 wherein the mounting device is made of fiberglass.

8. A method of manufacturing a mounting device, the method including:

forming an opening in a top surface of the device;

forming a plurality of mounting units in the top surface of the device;

forming a reinforced portion that extends across a substantial portion of the mounting device including a recessed portion and the top surface along a bottom of the top surface in at least one area between the opening and the mounting units; wherein the reinforced portion includes a honeycomb structure; and forming a close-out flange extending around the periphery of the mounting device and aerodynamically sealing between the mounting device and surface of a vehicle extending from the top surface to a point beyond the reinforced portion so that the depth of the close-out flange is larger than the depth of the reinforced portion.

9. The method of claim 8 wherein the opening is sized to accommodate communication wiring.

10. The method of claim 8 including forming a device mounting ring on the opening.

11. The method of claim 8 wherein the thickness of the reinforced portion is greater than an unreinforced portion.

12. The method of claim 10 wherein the device mounting ring is made of fiberglass.

13. The method of claim 8 wherein the reinforced portion extends across a substantial surface area of the mounting device.

14. The method of claim 8 wherein the mounting device is made of fiberglass.

* * * * *